Oct. 9, 1962   G. M. ANDERSON ET AL   3,058,046
BATTERY CHARGING CIRCUIT
Filed Dec. 17, 1958
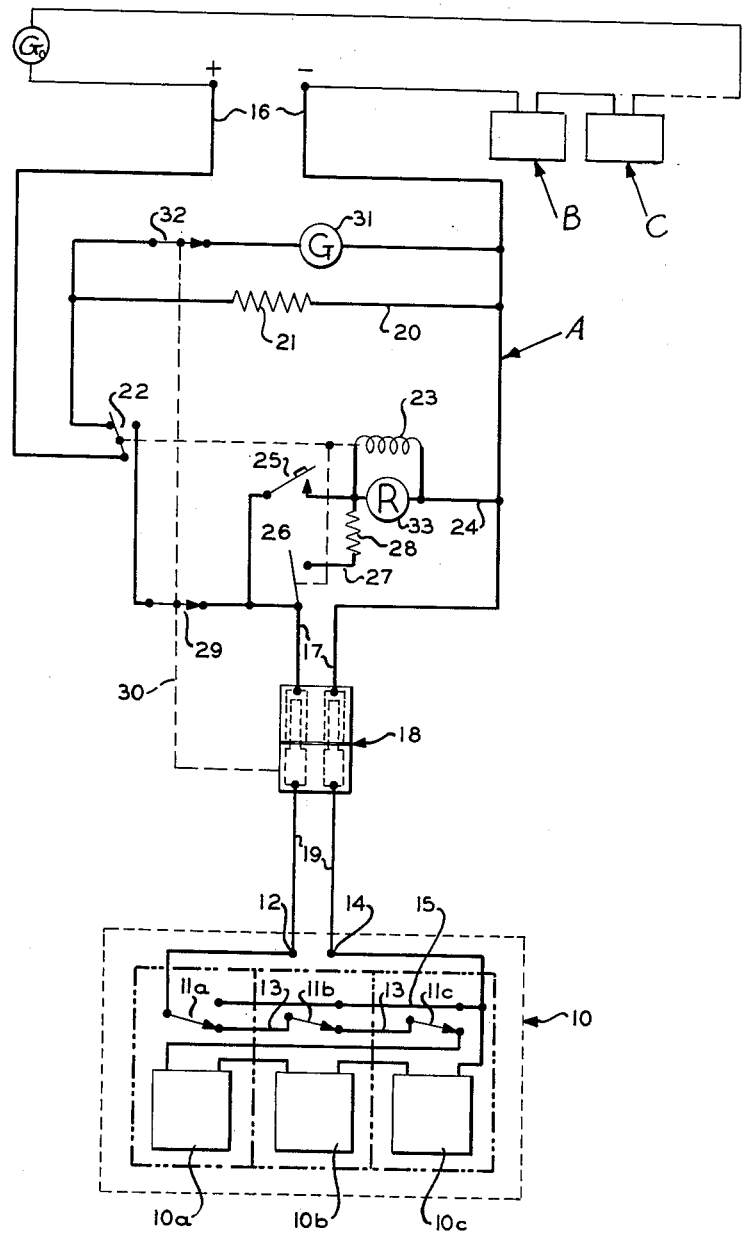
INVENTORS
GEORGE M. ANDERSON
SOL S. JAFFE
BY
George H. Fritzinger
AGENT

United States Patent Office 3,058,046
Patented Oct. 9, 1962

3,058,046
BATTERY CHARGING CIRCUIT
George M. Anderson, Whippany, and Sol S. Jaffe, West Orange, N.J., assignors, by mesne assignments, to The Electric Storage Battery Company, Philadelphia, Pa., a corporation of New Jersey
Filed Dec. 17, 1958, Ser. No. 781,160
4 Claims. (Cl. 320—33)

This invention relates to charging circuits for electric storage batteries and particularly to charging circuits for mine-lamp batteries of the sealed type having a control switch or switches operated according to the pressure of the enclosed gases in the battery.

A mine-lamp battery is worn by the worker and has a capacity sufficient to supply the miner's lamp for a single day's work shift. After each such work shift the battery is connected to a charging rack to be recharged for the next day's use. It is preferred that a miner's battery be hermetically sealed in order to prevent any accidental leakage or spillage of electrolyte during the use of the battery and during charging since any such electrolyte loss may cause injury to the worker and would impair the efficiency of the battery.

Hermetically sealed storage batteries are typically of the alkaline electrolyte form using nickel positive and cadmium negative electrodes. The cells are arranged as in accordance with the teachings of the pending Grieger application Serial No. 563,753, filed February 6, 1956, so that oxygen gas is evolved from the positive electrode on overcharge and from the negative electrode on overdischarge, this evolved gas later recombining with the negative electrode without any resultant change in the content of the electrolyte. Because of the gas evolution, charging of hermetically sealed batteries must be carefully controlled. To this end sealed batteries are provided with control switches which are typically pressure operated but which may be operated alternatively by relays each connected between one of the main electrodes and a subsidiary catalyzing electrode such as is taught by the pending Jaffe application Serial No. 651,856, filed April 10, 1957, now U.S. Patent 3,005,943.

An object of our invention is to provide charging circuits for individual batteries which can be connected in series across a common voltage source and which are adapted to maintain continuity of the circuit and a substantially constant load impedance on the charging source under all different stages of operation of the individual charging circuits.

Another object is to provide charging circuits which can be activated to shift connection of the input leads from a load resistor to the output leads only when a battery is positively electrically connected to the latter.

Another object is to provide an improved charging circuit for a hermetically sealed battery wherein the battery control switch or switches are used in a novel relationship with the charging circuit elements to obtain a better and more dependable control of the charging operation.

A feature of the invention is to provide the charging circuit with an activating relay for switching connection from the load resistor to the battery terminals, and to make use of power from the battery to be charged for initially operating this relay. This assures that no damage can be done to the charging circuit if the connections between the charging circuit and the battery are deficient. Once the relay is operated even momentarily it transfers the charging current to the battery to be charged and diverts a small portion of this current through the relay to hold it operated. When the battery has become charged its control switch is operated to drop out the activating relay and restore the charging circuit from the battery to the load resistor.

Other objects of the invention are to provide signaling means in the charging circuit adapted to indicate when the battery is positively electrically connected to the charging circuit and the circuit is not yet activated, and when a battery connected to the charging circuit is undergoing charge.

These and other objects and features of our invention will be apparent from the following description and the appended claims. In the description of our invention reference is had to the accompanying drawing illustrating the invention.

In the drawing there is shown a charging circuit for an individual battery 10 which may comprise one or more cells three cells 10a, 10b and 10c being shown in series by way of example. These cells may be of the nickel cadmium alkaline type such as are disclosed in the pending Grieger application Serial No. 563,753, filed February 6, 1956, now U.S. Patent 3,022,363. The cells have individual switches 11a, 11b and 11c each of the single-pole double-throw type. These switches are typically pressure operated and normally have the positions shown in the drawing. However, when an excessive internal pressure develops in any one of the cells, such as will occur from evolution of oxygen from the nickel positive electrode when the electrode is overcharged and by evolution of oxygen gas from the negative electrode when the electrode is overdischarged, the respective switch is operated to its other position. In order to assure that only the positive electrode will be ever overcharged and only the negative electrode will ever be overdischarged, the positive electrode has a higher state of charge than the negative electrode and has also a lesser remaining charge capability than the negative electrode as is taught by the pending Grieger application abovementioned.

For the purposes of the present charging circuit the individual cell switches 11 are serially connected with the cells as by connecting one terminal 12 of the battery to the pole of switch 11a, running jumpers 13 from the closed contacts of switches 11a and 11b to the poles of the next succeeding switches and connecting the closed contact of switch 11c with the first of the cells 10a. The last of the serially connected cells 10c is then connected to the other terminal 14 of the battery. Each of the open contacts of the switches 11 are connected by a jumper 15 to the terminal 14. Thus, upon any one of the cell switches being operated the battery circuit is broken and a short is provided across the terminals 12 and 14.

The charging circuit A for the individual battery 10 has a pair of plus and minus input leads 16 to be connected serially with a number of other such individual charging circuits, B, C et cetera to a common D.C. generator $G_0$. For a battery of three cells of the type described, having a nominal voltage when charged to about 3.6 volts, the charging source would have approximately 4.3 volts. The charging circuit has a pair of output leads 17 to be connected to the battery 10 to be charged. This connection is made, for example, through a plug type connector 18 having pin and jack elements for the respective leads, and through lead wires 19 running from the connector to the battery terminals 12 and 14. The charging circuit has a by-pass 20 including a load resistor 21 for providing a load on the charging source before the charging circuit is activated equal to that of the battery to be charged. This is necessary because as abovementioned a number of these charging circuits are connected in series—i.e., as many as there are individual batteries to be charged from a single generator at any one time—and the overall charging arrangement is to be such as to permit individual batteries to be plugged in and disconnected from the charging rack without breaking the circuit or altering the load condition on the generator.

The by-pass 20 is normally connected across the input leads 16 through a single-pole double-throw switch 22 of a relay 23. The relay is connected in a circuit 24 across the output leads 17. This circuit has a normally open pushbutton switch 25 which when pressed closed will activate the relay from power of the battery 10 to be charged. Thus the relay can be activated only when a battery to be charged has been positively electrically connected to the output leads of the charging circuit. As the relay is activated the switch 22 is thrown to disconnect the charging source from the by-pass 20 and to connect it to the output leads 17. In order to avoid any break in the charging circuit as this transfer occurs the switch 22 is preferably of the make-before-break type. Also, as the relay 23 is operated another switch 26 thereof is closed to connect a holding circuit 27 in parallel with the pushbutton switch 25 so that operation of the relay will be maintained after the pushbutton switch is released.

Since the relay 23 is to be operated from the battery to be charged, it is designed to operate positively from a voltage source of about 2.0 volts or more—which would be the minimum voltage of any so-called discharged three cell battery after a short standby, it being understood that it is the practice to refer to a battery as being discharged when its output voltage has fallen by a predetermined percentage of its fully charged voltage. However, in order that excessive current may not be supplied to the relay from the higher voltage charging source through the holding circuit 27 when the battery reaches a full charge, the holding circuit is provided with a voltage cut-down resistor 28.

From the foregoing description it will be apparent that the charging circuit for each individual battery will initially present its proper load resistance derived from the by-pass load circuit and that only if a battery is connected to the charging circuit can a continuity of circuit be transferred from the by-pass to the battery to be charged. This prevents accidental opening or shorting of each individual charging circuit. As so far described, however, if the plug 18 were disconnected while a battery is still undergoing charge the relay 23 would stay activated and would constitute (via its resistor 28) the whole load on the charging input leads 16. In order that this cannot occur, a switch 29 is provided as in the lead running from the switch 22 to the holding circuit 27. This switch is mechanically coupled to the plug 18, as indicated diagrammatically by the dotted line 30, so that the switch is closed only when the plug is connected. Upon pulling the plug 18 while a battery is still undergoing charge, the switch 29 is opened to drop out the relay 23 and transfer continuity of the charging circuit to the by-pass 20. Also, when any of the cells of the battery 10 becomes charged to the point where its control switch is operated, the battery is disconnected from the charging circuit and a short is provided across the terminals 12 and 14. This removes current from the relay 23 causing it the drop out and to return connection of the charging circuit to the by-pass 20.

For signalling purposes a lamp 31 adapted to give a green light when energized is connected across the load resistor 21 through a switch 32 controlled also by the connector 18, and a lamp 33 adapted to give a red light when energized is connected across the relay 23. The switch 32 is closed as the plug connector 18 is engaged so as to cause a green signal light to be given when a battery has been connected to the charging circuit but the circuit has not yet been activated. When the charging circuit is activated the green light goes out and the red light comes on. So long as the battery is undergoing charge this signalling condition remains. However, when the charging is terminated by operation of one of the battery switches, as above described, the red light goes out and the green light again comes on.

The foregoing detailed description of our invention is intended to be illustrative and not necessarily limitative of our invention, since the same is subject to changes and modifications without departure from the scope of our invention, which we endeavor to express according to the following claims.

We claim:

1. A charging circuit for a battery having a switch operated by the battery when the battery reaches a predetermined state of charge, comprising a pair of input leads for said charging circuit to be connected to a source of charging voltage, a pair of output leads for said charging circuit, means for connecting said output leads to said battery to be charged, a by-pass circuit for said input leads having a load resistance for simulating the load on said charging source of a battery to be charged, a relay operable by power from a battery to be charged, a manual switch for momentarily connecting said relay across said output leads, switch means included in said relay for connecting said input leads across said by-pass circuit when the relay is not operated and for shifting connection of said input leads from said by-pass circuit to said output leads when the relay is operated, said relay including also switch means for providing a holding circuit across said manual switch to maintain the relay operated from voltage across said output leads when the relay is operated, and said battery including circuit means controlled by said battery switch for disconnecting the battery from said output leads and for shorting said output leads to drop out said relay when said battery switch is operated.

2. The charging circuit set forth in claim 1 including a signal means, and means responsive to said means for connecting the output leads to the battery to be charged is connected to said output leads for connecting said signalling means across said load resistor of said by-pass circuit as said connection is made.

3. The charging circuit set forth in claim 1 including switch means responsive to said means for connecting the output leads to the battery which means are operative when said battery is being disconnected from said output leads while said relay is operated for disconnecting said relay from said input leads.

4. A charging circuit for a sealed storage battery having pressure switch means for disconnecting the battery from its terminals and shorting the terminals when a cell of the battery reaches a predetermined state of charge, comprising a pair of input leads to be connected to a charging source of voltage, a pair of output leads, connector means for connecting said output leads to the terminals of a battery to be charged, a circuit across said output leads including a manual push switch and a coil of a relay operable by power from a battery to be charged, a by-pass circuit including a load resistance adapted to simulate the load on said charging source of a battery to be charged, a single-pole double-throw switch in said relay for connecting said input leads across said by-pass circuit when the relay is not operated and across said output leads when the relay is operated, said latter connection including switch means controlled by said connector means for completing said connection of said input leads across said output leads only when the relay is operated and a battery is connected to said output leads, and a holding circuit across said manual switch including a switch of said relay rendered closed by operation of the relay to maintain the relay operated so long as power is provided across said output leads.

References Cited in the file of this patent

UNITED STATES PATENTS

| | | |
|---|---|---|
| 1,905,741 | Oliver | Apr. 25, 1933 |
| 2,334,289 | Richards | Nov. 16, 1943 |
| 2,498,814 | Little et al. | Feb. 28, 1950 |
| 2,510,141 | Richards | June 6, 1950 |
| 2,649,565 | Ihrig | Aug. 18, 1953 |
| 2,789,265 | Hallidy | Apr. 16, 1957 |